United States Patent [19]

Forrest

[11] 4,186,386
[45] Jan. 29, 1980

[54] INSTRUMENT HOUSING
[75] Inventor: John W. Forrest, West Acton, Mass.
[73] Assignee: Bowmar/Ali, Inc., Action, Mass.
[21] Appl. No.: 868,417
[22] Filed: Jan. 10, 1978
[51] Int. Cl.² .......................... H02B 1/08; G08B 5/00
[52] U.S. Cl. ................................. 340/366 R; 340/381
[58] Field of Search .......................... 340/366 R, 381; 116/202; 361/331

[56] References Cited
U.S. PATENT DOCUMENTS
2,802,972  8/1957  Warrington ......................... 361/331

Primary Examiner—Harold I. Pitts
Attorney, Agent, or Firm—Weingarten, Maxham & Schurgin

[57] ABSTRACT

A segmented housing for electrical instrumentation particularly panel mounted meters of the electro-optical readout variety. The housing is formed in first and second halves separating the housing into substantially similar upper and lower portions which are secured together and to a panel mounting bracket by recessed bolts on opposite sides. The brackets are located in side channels extending a substantial portion of the housing side length to provide a highly rigid and secure attachment. The housing halves are apertured in the rear to permit electrical connection through lugs to a circuit board within. The front halves are apertured and beveled for panel mounting with a molding surrounding the aperture through which an indicator scale is visible. One or more lens elements provides scale indication and/or scale magnification. The housing resulting from the securing of the two halves together forms a trim, flat package such that a plurality of the units may be closely stacked for high density display applications. The entire housing structure aside from the brackets is preferably injection molded of plastic.

13 Claims, 4 Drawing Figures

INSTRUMENT HOUSING

FIELD OF THE INVENTION

The present invention relates to small housing units for electronic indicator circuitry.

BACKGROUND OF THE INVENTION

Increasingly, electron circuitry, including that employed for providing visual indications of a magnitude, are being constructed of components mounted upon printed circuit boards. With the common availability of integrated circuit components, often entire electronic instruments can be built out of a number of such integrated circuit elements mounted upon a single printed circuit board with, in the case of indicating instruments, an output indication element located along one end of the printed circuit board. As a result, the entire electronics unit has the flat, plate-like physical dimensions. Such units are often employed in stacked arrays to provide output plural indications and are panel mounted for visual perception by an operator. Here housings for the electronics should match in shape the basic dimensions of the printed circuit board to reduce size and should further permit a secure and rigid mounting of the entire electronics package to the panel. The housing must at the same time permit efficient and economical electrical connection to the circuitry within, particularly in the case where a plurality of the elements are stacked in adjacent relationship along a panel.

SUMMARY OF THE INVENTION

In accordance with the teaching of the present invention a flat pack housing is provided which is adapted particularly to accommodate single printed circuit board electron units, or electronics of similar dimensions designed for panel mounting. The housing consists of first and second substantially similar housing halves which are configured to mate and be secured together with a minimum of protrusions. A set of detachable brackets are secured within channels along edges of the housing halves and are bolted to the housing by the same bolts which hold the housing halves together. The channel edges provide the brackets with additional leverage to increase the rigidity of their hold upon the housing and correspondingly upon the panel to which the housing may be attached through the brackets. The housing is typically provided with an aperture in each of the halves at a front defining end through which an indicator scale may be visible. Preferably, one or more lens elements are secured inside the aperture to enhance the readability of the indicator scale. Opposite to the front aperture, rear sides of the housing halves are apertured to receive electrical connection lugs from the printed circuit board contained within to permit simple connection of electrical power and input/output leads. The housing halves are preferably provided with locating edges and pins as well as snap action clips to hold them in position and together prior to the more complete securing by the bracket bolts.

DESCRIPTION OF THE DRAWING

These and other features of the present invention are more fully set forth below in the exemplary and nonlimiting detailed description of the invention and accompanying drawing of which.

DETAILED DESCRIPTION OF THE INVENTION

The present invention contemplates a housing for typically single printed circuit board electronics adapted for providing a visual output indication of a magnitude. The housing includes first and second halves which fit together around the printed circuit board in a pancake-shaped, flat pack with minimal dimensional extension permitting close stacking of a plurality of such housings. The housing sides are channeled to accept and rigidly hold a mounting bracket for panel mounting of the housing in a position for operator viewing of the displayed magnitude. The housing includes internal holding brackets for the display and various filters or lenses which may be placed over the viewing scale of the display.

Figure 1:
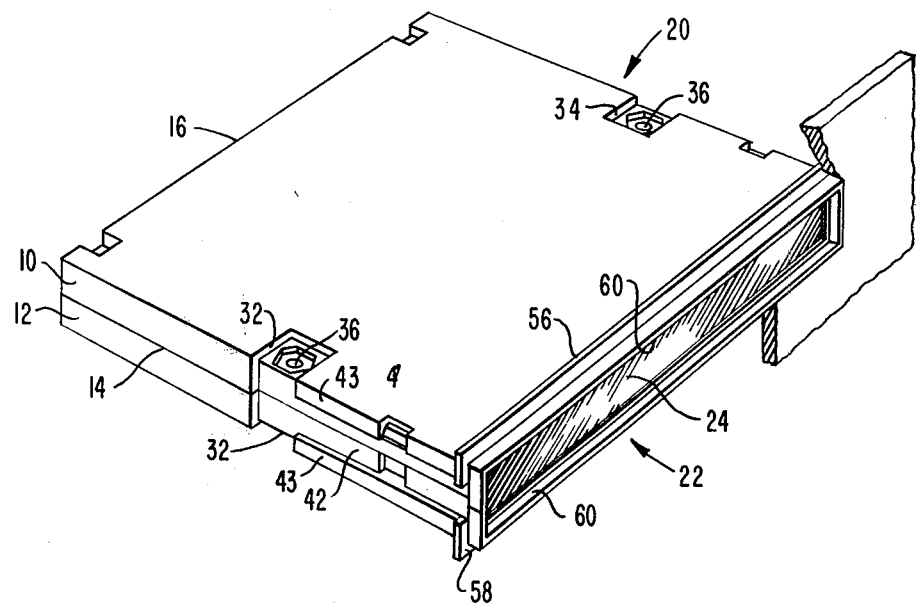
FIG. 1 is a perspective view of the housing including first and second halves in assembled position.

With regard to the drawing and in particular to FIG. 1, the instrument housing of the present invention is illustrated. As shown in FIG. 1, the housing is composed of first and second halves 10 and 12 forming respective top and bottom portions and shown secured together along a center line 14. The housing, and the first and second halves 10 and 12, comprises a rear side section 16 as well as opposing first and second sides 18 and 20 along with a front portion 22 having an aperture 24. Typically, the indication or display portion of the electronic instrumentation is visible through the aperture 24.

Figure 2:
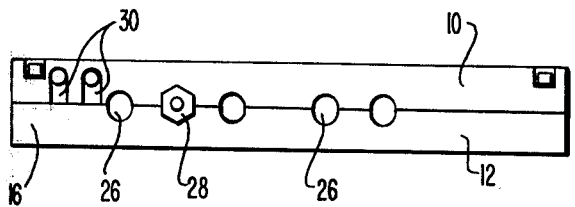
FIG. 2 is a rear view of the housing of FIG. 1.

The rear portion 16 of the housing is shown more particularly in FIG. 2 and has a series of apertures 26 through which electrical terminals such as screws and attached nuts as illustrated by screw and nut assembly 28 may be lead. The apertures 26 are typically formed by semicircular holes in each of the top and bottom halves of the housing at matched locations. Additional apertures such as semicircular or extended semicircular openings 30 in the top half 10 are provided for access to adjustment controls on the circuitry.

Figure 3:
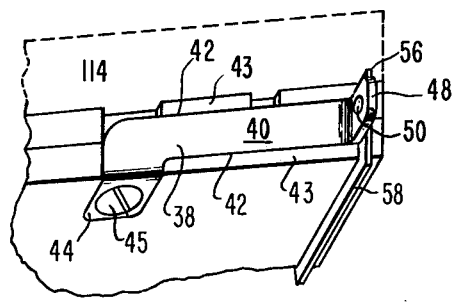
FIG. 3 is a side view of a portion of the housing of FIG. 1 showing a mounting bracket in secured relation to the housing.
Figure 4:
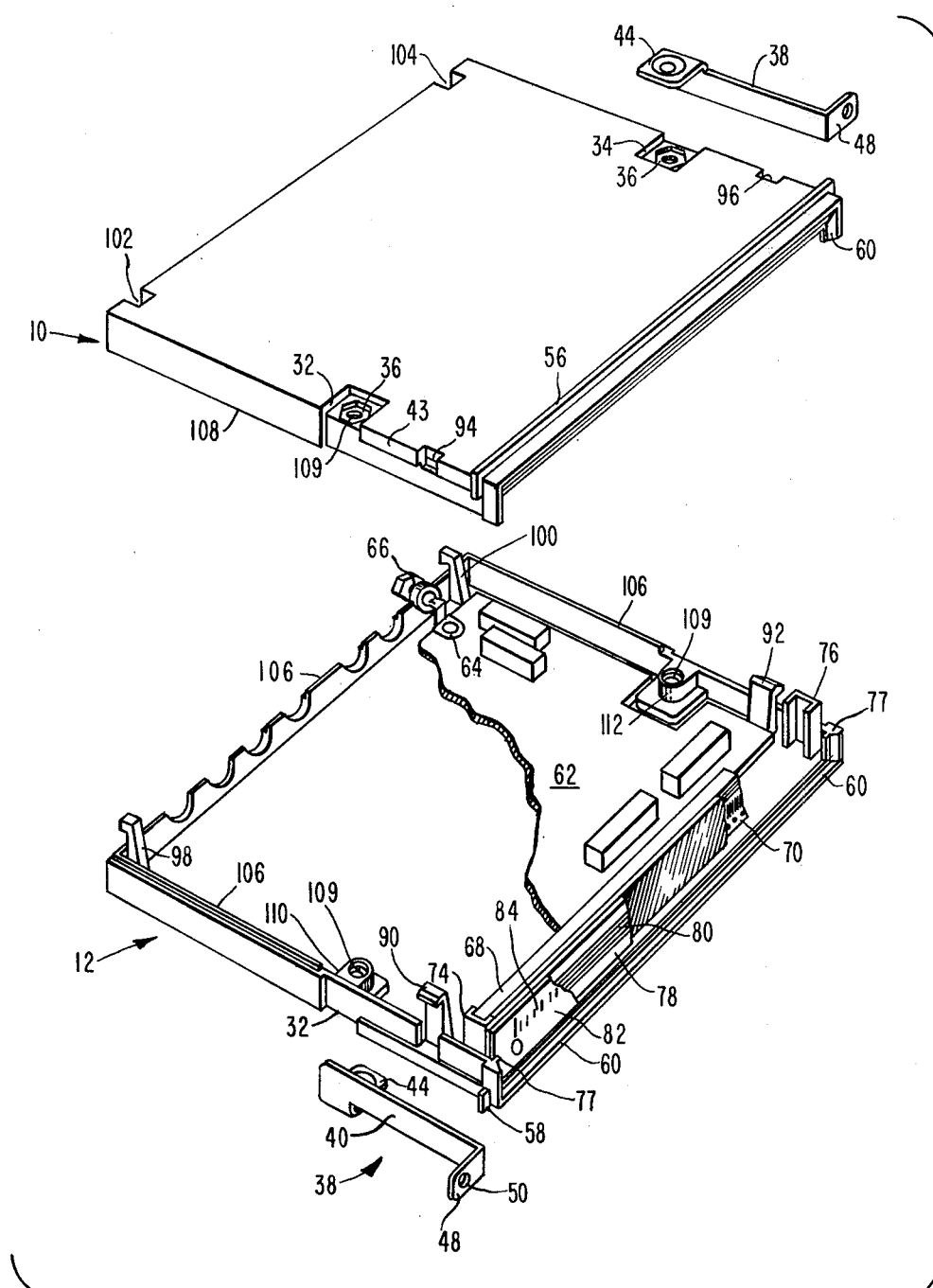
FIG. 4 is a view of the housing with the first and second halves separated showing typical internal components and structure of the housing.

As illustrated in FIG. 1, the top and bottom housing halves 10 and 12 may typically be secured together by bolts placed through the two halves at indentations 32 and 34. The indentations 32 and 34 include recesses 36 of hexagonal shape to accommodate a hexagonal nut. Typically, a bracket such as bracket 38 illustrated in FIGS. 3 and 4 is provided having a central portion 40 which fits within a channeled recess 42 provided between shoulder portions 43 of the top and bottom housing halves 10 and 12. The bracket 38 has a first side orthogonally disposed flange member 44 which fits within the bottom portion of the recess 32 (and top portion of recess 34) and through which a bolt 45 is placed to mate with a nut 46 disposed within the hexagonal recess 36 of the indentations. On the opposite end of the bracket 38 a further orthogonally disposed flange member 48 is provided having an aperture 50 for bolt attachment to a panel. Shoulder portions 43 of the top and bottom housing halves 10 and 12 which form the channel within which the brackets 38 are placed provide rigid bracket support to permit a firm and relatively inflexible support between the joined housing halves 10 and 12 and each bracket 38.

Bevels 56 and 58 in respective top and bottom housing halves 10 and 12 are provided at the front edge 22 to butt against a panel apertured to receive a molding portion 60 of the front end of each top and bottom housing half 10 and 12. Bevels 56 and 58 are coplanar with flange 48 and of similar thickness to permit mounting on either panel side.

With reference now to FIG. 4, further details of the housing of the present invention are illustrated in a view in which the top and bottom portions 10 and 12 are shown in separated view revealing an interior printed circuit board 62 having attached thereto electrical connection lugs represented by lug 64 with screw 66 attached thereto and protruding through the aperture 26 in the rear portion of the top and bottom housing halves. The printed circuit board typically has an orthogonally disposed, indicating or display panel 68 placed adjacent to the aperture 22 and containing, in typical example, a plurality of light emitting diode elements 70 which may be selectively illuminated to indicate the magnitude of a value being measured. The bottom half 12 of the housing is shown to include first and second vertically disposed channel guides 74 and 76 into which the panel is placed. In the illustration FIG. 4 a lens 78 is provided between guides 74 and 76 and a lip 77 of the moulding 60 and having a fresnel portion 80 disposed adjacent to the light emitting diode elements 70 to provide vertical magnification thereof for facilitating operator perception of the display magnitude. In addition, a further filter 82 is provided having a polarization characteristic to reduce reflection so as to eliminate glare that might impair the ability to read the displayed magnitude. The filter 82 also includes scale markings 84 for calibration of the displayed magnitude.

In addition, the bottom housing half 12 includes first and second clips 90 and 92 disposed to mate with recesses 94 and 96 in the top housing half to provide positioning and temporary securing of the two halves together. Locating pins 98 and 100 are disposed at the rear of the bottom housing half 12 and have rear facing projecting portions which mate with slots 102 and 104 in the top housing half 10 for further positioning. Shoulders 106 are provided in the bottom housing half 12 on the inner half which mate with similarly disposed shoulders 108 on the outer edges of the side and rear edges of the top housing half 10.

Screw locating apertures 109 are provided through the recesses 36 and through spacer supports 110 and 112 of the bottom housing half 12 and similar spacers in the top housing half 10.

The resulting housing for a single circuit board electronic package or similar pancake-shaped electronic unit provides a compact and rigid housing and mounting apparatus which additionally permits close adjacent stacking of plural elements such as element 114 (FIG. 3) particularly useful for providing a plurality of displayed variables in a panel. The specifically described embodiment is intended as illustrative only, alterations and improvements being intended to fall within the scope of the invention as defined in the following claims.

What is claimed is:

1. An instrument housing comprising:
   first and second mating housing halves having respective top and bottom panels, opposite side panels, multiple apertured rear panels and front, apertured viewing regions;
   means for securing said first and second housing halves together;
   a pair of mounting brackets for mounting said housing halves in secured relationship to a panel;
   means for securing said brackets to said housing halves;
   the opposing sides of said housing halves being channeled to receive said brackets along a substantial length of the sides thereof to provide rigid placement of said bracket.

2. The housing of claim 1 wherein said means for securing said bracket includes said means for securing said first and second housing halves together.

3. The housing of claim 2 wherein each of said pair of brackets are of identical shape secured along opposite ones of said sides of said first and second housing halves and extending forward toward the front portion thereof.

4. The housing of claim 1 further including a bevel on at least one of said first and second housing halves towards the front thereof for positioning said housing halves, in secured relationship, to a panel.

5. The housing of claim 1 further including:
   filter means; and
   means for securing said lens means adjacent to the aperture of the front portion of said first and second halves.

6. The housing of claim 5 further including:
   a display panel; and
   a grooved column extending from at least one of said first and second halves near the front aperture thereof adapted to receive ends of said panel.

7. The housing of claim 5 wherein said filter means includes a scale for the indication of a value magnitude.

8. The housing of claim 5 wherein said filter means includes a magnifying element.

9. The housing of claim 8 further including an indicator strip placed within said housing between said first and second housing halves and having a series of illuminable spots thereon facing toward the aperture of the front portion of said first and second housing halves inside of the magnifying portion of said lens.

10. The housing of claim 1 further including at least one snap-catch means associated with said first and second housing halves for releasably snap latching said first and second halves together.

11. The housing of claim 10 further including at least one positioning pin means associated with said first and second housing halves for positioning said housing halves with respect to each other in the secured relationship.

12. The housing of claim 1 wherein a printed circuit board is contained within said first and second housing halves in secured relationship and having a plurality of electrical connection lugs secured thereto and protruding through the holes in the rear sides of said first and second housing halves.

13. A flat pack housing and panel attachment comprising:
   a housing having first and second opposite sides;
   a pair of shoulders on each of said first and second sides defining a channel recess therebetween;
   first and second brackets having elongate body portions adapted to be received in each channel recess and further having a lip extending into a recess in a side of said housing adjacent to each of said first and second sides; and
   means for securing each lip to said housing.

* * * * *